No. 753,350. PATENTED MAR. 1, 1904.
J. A. BEAM.
THRESHING MACHINE.
APPLICATION FILED MAR. 6, 1903.
NO MODEL.
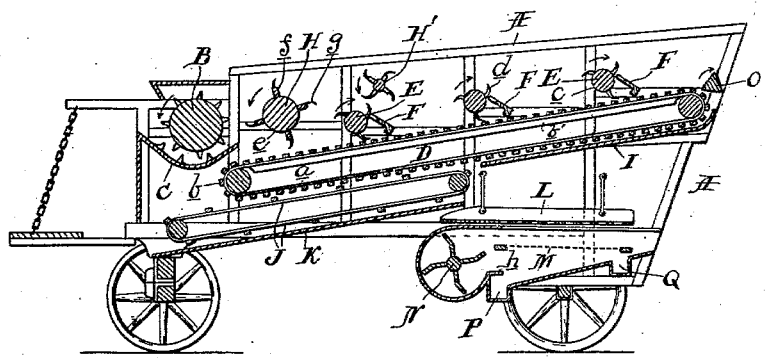
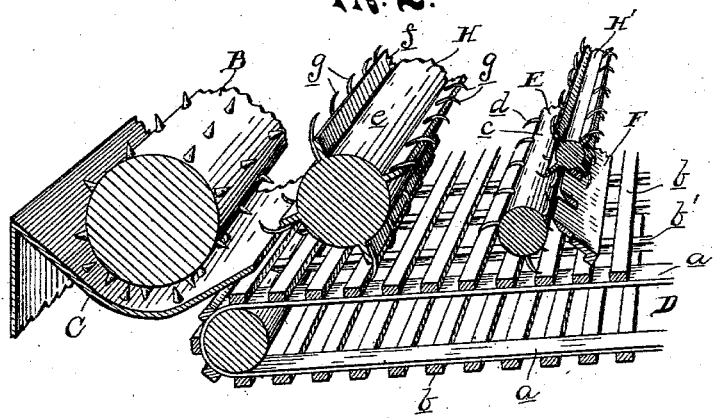
WITNESSES.
L. E. Flanders
T. S. Longstaff
INVENTOR.
John A. Beam
Attorneys.

No. 753,350. Patented March 1, 1904.

UNITED STATES PATENT OFFICE.

JOHN A. BEAM, OF BADEN, CANADA.

THRESHING-MACHINE.

SPECIFICATION forming part of Letters Patent No. 753,350, dated March 1, 1904.

Application filed March 6, 1903. Serial No. 146,460. (No model.)

*To all whom it may concern:*

Be it known that I, JOHN A. BEAM, a subject of the King of Great Britain, residing at Baden, in the county of Waterloo, Province of Ontario, and Dominion of Canada, have invented certain new and useful Improvements in Threshing-Machines, of which the following is a specification, reference being had therein to the accompanying drawings.

The invention relates to threshing-machines, and more particularly to the means employed for separating the grain from the straw after it has passed the threshing-cylinder and is designed as an improvement upon my prior patent, No. 690,690, of January 7, 1902.

In my former patent in order to give the necessary capacity to the machine the tines had to be spaced too far apart and the grain and straw would shoot right through, and as these tines or vibratory beaters worked up and down by a pitman the grain and straw would shoot right through in bunches when in its raised position, as it could not be made to vibrate fast enough to prevent the straw, &c., from shooting right over the separator-roll in bunches, and I therefore placed a two or four winged beater above and in rear of the separator-roll, so as the straw came over the roll in bunches the beater would knock it down and the fingers would take it away rapidly and part or break it up, and by placing a winged drum between the cylinder and separator it prevents the grain from being shot through in bunches and at the same time assists the feeding of the grain to the separators.

This invention has for its object to overcome these difficulties and make a more perfect separation of the grain and straw in a rapid and economical manner; and to this end it consists in the employment of a winged drum or cylinder intermediate between the cylinder and separator which will break up and prevent the straw or grain from shooting through to the separator in bunches and which will at the same time help to feed it evenly to the separator.

The invention consists, further, in the employment of a winged beater adjacent to the separator which will aid in further separating the grain and chaff and take it away rapidly as it comes over the separator and break up the straw should it come over in bunches; and it consists, further, in the employment of a rotating triangular wiper adapted to wipe off the straw from the carrier and prevent it from being carried back into the machine.

This invention consists, further, in the peculiar construction, arrangement, and combination of parts, all as more fully hereinafter described and claimed, reference being had to the accompanying drawings, in which—

Figure 1 is a vertical central longitudinal section through a machine embodying my invention; Fig. 2, a perspective view showing a portion of the carrier, together with the threshing-cylinder, the revolving separator, and the winged drum.

A is the frame; B, the threshing-cylinder arranged therein; C, the concave, and D the endless carrier, which extends from the concave to the rear of the machine and is inclined slightly upward. This carrier is preferably formed of endless side chains or belts $a$ and the cross-bars $b$, traveling upon the supporting-strip $b'$. Arranged above this carrier and extending across the machine are a series of rotary separators E of the following construction: $c$ is a wooden roll or cylinder journaled in bearings on the frame. $d$ represents curved teeth secured to the roll, and preferably arranged in three or more longitudinal rows, the teeth of one row alternating with those of the next. The roll is so arranged that the teeth $d$ will just clear the carrier in the rotation of the roll, which is in the direction indicated by the arrow—that is, turning over in the direction of travel of the carrier. The teeth $d$ are so curved that their points extend backward in relation to the direction of rotation. Adjacent to each roll is a slotted steel plate F, sharpened at its forward edge, which acts as a comb and forms a cleaner for the teeth of the separator.

Several of the rotary separators E are preferably arranged above the carrier D, the drawings showing three, and between the first of these separators and the threshing-cylinder is journaled a winged drum H. This drum comprises the roll e, carrying the radial wings f, to each of which a series of rearwardly-curved fingers or tines g are secured, similar to those of the separators, the drum being located between the cylinder and separator, so as to give sufficient clearance on either side, the drum acting as a deflector to prevent the grain and straw from shooting through to the separator, while the wings and tines beat the grain and tend to break the bunches and aid in uniformly feeding the grain and straw to the separators. Journaled in the frame above and slightly in rear of the first separator-roll is a two or four winged beater H', revolving in a direction similar to that of the drum and formed with radial wings and rearwardly-curved tines, as shown, which prevents the grain and straw from shooting over the separator-roll and assists in beating it down and breaking up the bunches and feeding the grain and straw over the separator-roll to the next.

Beneath the carrier D, at the rear of the machine, is an apron I, and beneath the forward portion of said carrier is the carrier J, having an apron K arranged therebeneath. L is a longitudinal vibrating riddle or chaffer, having its upper end arranged beneath the discharge end of the carrier J and of the apron I.

M is a laterally-vibrating riddle beneath the riddle L, and N is an overshot fan for directing an air-current up through said riddle, the blades being slightly inclined, so as to push the wind out and not backlash and draw it back as the horizontal board h cuts or strips the wind off.

O is a rotating bar of polygonal (preferably triangular) cross-section journaled in bearings, so that it will revolve in close proximity to the carried D to wipe off the straw from the endless carrier and prevent it from being carried back into the machine, the straw being discharged onto the straw-carrier or wind-stacker. (Not shown.)

The various operating parts may be driven by any suitable connecting mechanism. (Not shown.)

The parts being constructed as shown and described, the operation is as follows: The grain to be threshed first passes between the threshing-cylinder and concave and is discharged onto the lower end of the carrier D, which will carry it toward the rear of the machine. When first deposited on the carrier, the straw is subjected to the action of the winged drum, which acts as a deflector and prevents the straw,&c., from shooting through from the cylinder to the separator in bunches, the wings at the same time beating it so as to knock the grain from the straw and break up the bunches, the fingers parting or breaking it up further and rapidly feeding it with the aid of the carrier to the separator, which picks it up and throws it over the roll and against the winged beater H', which knocks the grain from the straw and parts or breaks it up still further and throws it to the next separator over the cleaning-plate. As the teeth of these separators are curved backward in relation to the direction of rotation, they will not become permanently engaged with the straw and will be easily cleaned by the stripping action in passing through the slotted plates F. With each succeeding separator the straw is treated in the same manner, being lifted over and throw down, so that by the time it reaches the end of the carrier the grain is thoroughly eliminated therefrom, the straw being wiped off from the endless carrier by the triangular wiper O onto the straw-carrier. The grain separated by this treatment drops through the bars of the carrier onto the apron I or through the carrier J onto the apron K. That on the apron I will descend by gravity to its lower end and be deposited upon the riddle L, while that falling on the apron K is drawn upward by the bars of the carrier and is also deposited on said riddle. From the riddle or chaffer L the grain will pass to the riddle M and is finally discharged through a spout P after passing through the air-current, the heads or grain not hulled being discharged into the spout Q and the chaff discharged over the rear end of the riddle L onto the straw-carrier or wind-stacker.

A machine constructed as above described is exceedingly effective in separating all the grain from the straw and is also free from clogging. This is due to the peculiar character of the rotary separators employed in connection with the winged beater and drum, which prevents the straw from being shot out from the cylinder and over the first separator, the tines of all of which are bent back so as to be easily disengaged from the straw and avoid clogging.

Where a drum only is used between the cylinder and separator, I find that it has to be made so large in order to properly fill the space that the grain and straw shoots against the drum and flys out over the feeder's face and is scattered over the barn, and where a beater only is used it causes too much wind and forces the dust, &c., out in the feeder's face, making it disagreeable to work, while with my combined device I overcome these objections by using a drum of medium size and small wings, which help to fill the space and prevents the straw from shooting through in bunches and does not cause too much wind, the tines on the wings and the wings themselves acting to part the straw and beat the grain therefrom.

What I claim as my invention is—

1. In a threshing-machine, the combination with the threshing-cylinder, its concave and an endless straw-carrier, extending rearwardly therefrom, of a rotary separator comprising a cylinder having teeth curving backward in relation to the direction of rotation, said cylinder being arranged across said carrier and adapted to pick up the straw therefrom and throw it over, a rotary winged drum having teeth curving backward in relation to the direction of rotation between said threshing-cylinder and separator and a winged beater above and in rear of the separator and coöperating therewith.

2. In a threshing-machine, the combination with the threshing-cylinder, its concave and an endless straw-carrier, extending rearwardly therefrom, of a rotary separator comprising a cylinder having teeth curving backward in relation to the direction of rotation, said cylinder being arranged across said carrier and adapted to pick up the straw therefrom and throw it over, a rotary four-winged drum between the threshing-cylinder and separator and a rotary four-winged beater above and in rear of said separator adapted to break up the straw and beat the grain therefrom as it goes over.

3. In a threshing-machine, the combination with the threshing-cylinder, its concave and an endless straw-carrier, extending rearwardly therefrom, of a rotary separator comprising a cylinder having teeth curving backward in relation to the direction of rotation, said cylinder being arranged across said carrier and adapted to pick up the straw therefrom and throw it over, a rotary winged drum between said threshing and separator cylinders, and a rotary winged beater above and in rear of the first separator-roll, said drum and beater having teeth curving backward in relation to the direction of rotation for the purpose described.

4. In a threshing-machine, the combination with the threshing-cylinder, its concave and an endless straw-carrier, extending rearwardly therefrom, of a rotary separator comprising a cylinder having teeth curving backward in relation to the direction of rotation, said cylinder being arranged across said carrier and adapted to pick up the straw therefrom and throw it over, a rotary winged drum between the threshing-cylinder and separator and a rotary four-winged beater above and in rear of the separator having teeth curving backward in relation to the direction of rotation and coöperating with the teeth of the separator to break up the straw and beat the grain therefrom.

5. In a threshing-machine, the combination with the threshing-cylinder, its concave and an endless straw-carrier, extending rearwardly therefrom, of a rotary separator comprising a cylinder having teeth curving backward in relation to the direction of rotation, said cylinder being arranged across said carrier and adapted to pick up the straw therefrom and throw it over, a rotary winged drum arranged between said threshing and separator cylinders, a rotary winged beater above and in rear of said separator and a rotary wiper adjacent to and arranged at the bend of the endless carrier at its upper end.

6. In a threshing-machine, the combination with a threshing-cylinder, its concave and an endless straw-carrier extending rearwardly therefrom, of a series of rotary separators arranged above said carrier, each comprising a cylinder having teeth curving backward in relation to the direction of rotation, a cleaning comb or bar for each separator, a rotary drum arranged between the threshing-cylinder and the adjacent rotary separator, a series of radial wings carried by said drum and teeth curving backward in relation to the direction of rotation carried by said wings.

7. In a threshing-machine, the combination with a threshing-cylinder, its concave and an endless straw-carrier extending rearwardly therefrom, of a series of rotary separators arranged above said carrier, each comprising a cylinder having teeth curving backward in relation to the direction of rotation, a cleaning comb or bar for each separator, a rotary winged drum arranged between the threshing-cylinder and the adjacent rotary separator and a rotary winged beater arranged above and in rear of one of said separators, for the purpose described.

8. In a threshing-machine, the combination with a threshing-cylinder, its concave and an endless straw-carrier extending rearwardly therefrom, of a series of rotary separators arranged above said carrier, each comprising a cylinder having teeth curving backward in relation to the direction of rotation, a cleaning comb or bar for each separator, a rotary winged drum having teeth arranged between the threshing-cylinder and the adjacent rotary separator and a rotary four-winged beater arranged above and in rear of the separator and having teeth, said teeth curving backward in relation to the direction of rotation, for the purpose described.

9. In a threshing-machine, the combination with a threshing-cylinder, its concave and an endless straw-carrier extending rearwardly therefrom, of a series of rotary separators arranged above said carrier, each comprising a cylinder having teeth curving backward in relation to the direction of rotation, a cleaning comb or bar for each separator, a rotary winged drum arranged between the threshing and adjacent separator cylinder, a rotary winged beater arranged adjacent to said separator and a wiper arranged adjacent to and at the bend of the endless carrier.

In testimony whereof I affix my signature in presence of two witnesses.

JOHN A. BEAM.

Witnesses:
 OTTO F. BARTHEL,
 THOMAS A. LONGSTAFF.